:::
United States Patent [19]

Heikkinen et al.

[11] 4,074,012

[45] Feb. 14, 1978

[54] FINE-METAL-PARTICLE-BASED MAGNETIC RECORDING MEDIUM OF IMPROVED ENVIRONMENTAL STABILITY

[75] Inventors: Duane G. Heikkinen, North St. Paul, Minn.; Thomas M. Kanten, Baldwin Township, St. Croix County, Wis.

[73] Assignee: Minnesota Mining and Manufacturing Company, Saint Paul, Minn.

[21] Appl. No.: 608,916

[22] Filed: Aug. 29, 1975

Related U.S. Application Data

[63] Continuation of Ser. No. 320,630, Jan. 2, 1973, abandoned.

[51] Int. Cl.$^2$ .............................................. H01F 10/02
[52] U.S. Cl. .................................. 428/425; 252/62.54; 360/134; 427/128; 428/323; 428/328; 428/413; 428/418; 428/461; 428/463; 428/539; 428/900
[58] Field of Search ............... 428/538, 539, 900, 425, 428/413, 418, 328, 323, 461, 463, 447, 411, 520, 212, 330, 329; 252/62.54; 360/134; 427/128, 132, 127

[56] References Cited

U.S. PATENT DOCUMENTS

| | | | |
|---|---|---|---|
| 3,148,082 | 9/1964 | Ricco et al. | 428/413 |
| 3,474,073 | 10/1969 | Higashi | 252/62.54 |
| 3,476,596 | 11/1969 | Carroll | 428/425 |
| 3,546,675 | 12/1976 | Che Chung Chou et al. | 250/65.1 |
| 3,554,798 | 1/1971 | Nacci | 346/74 |
| 3,562,011 | 2/1971 | Hirst et al. | 252/63.2 |
| 3,573,979 | 4/1971 | Honjo | 252/62.54 |
| 3,837,912 | 9/1974 | Roden | 252/62.54 |

FOREIGN PATENT DOCUMENTS

| | | |
|---|---|---|
| 1,161,068 | 8/1969 | United Kingdom. |
| 1,167,527 | 10/1969 | United Kingdom. |

*Primary Examiner*—George F. Lesmes
*Assistant Examiner*—Stanley S. Silverman
*Attorney, Agent, or Firm*—Cruzan Alexander; Donald M. Sell; Roger R. Tamte

[57] ABSTRACT

Magnetic recording media having a magnetizable layer that comprises fine metal particles based on iron, cobalt, or nickel dispersed in a nonmagnetizable binder material have improved environmental stability because of the presence in the magnetizable layer of an organic compound that bears sterically unhindered aliphatic amine functionality.

10 Claims, No Drawings

FINE-METAL-PARTICLE-BASED MAGNETIC RECORDING MEDIUM OF IMPROVED ENVIRONMENTAL STABILITY

This is a continuation of application Ser. No. 320,630, filed Jan. 2, 1973, now abandoned.

Fine metal particles based on iron, cobalt, or nickel are recognized to be potentially superior magnetizable pigments for magnetic recording media. One obstacle to fully realizing that potential is the high reactivity of the particles, which results from their very fine size (they are typically less than 1,500 angstroms in diameter), and from the normal reactivity of iron, cobalt, or nickel in typical storage environments for magnetic recording media. This reactivity causes the particles to become oxidized even when dispersed in binder material in a magnetic recording medium. Thus, when a prior-art magnetic recording tape based on fine metal particles is exposed to certain environments, the recording surface may become visibly corroded, and a significant part of any signal recorded on the tape may be lost. Recorded signals of short wavelength, such as 0.1-mil wavelength, are especially likely to be lost, because they are recorded near the surface of a recording medium; and that susceptibility to loss conflicts with the otherwise special advantage of fine-metal-based magnetic recording media for recording short-wavelength signals.

Attempts to passivate fine metal particles to make them useful for magnetic recording media or other magnetic articles have been widespread. See, for example, U.S. Pat. No. 3,156,650, which discusses formation of an outer protective layer of thin or of oxides of iron and cobalt on iron or iron-cobalt particles; U.S. Pat. Nos. 3,206,338, 3,228,881, and 3,520,676 directed to formation of non-pyrophoric iron-based particles; and U.S. Pat. No. 3,480,553, directed to formation of polymer coatings on fine metal particles.

Somewhat similarly as to a different magnetizable pigment, chromium dioxide, U.S. Pat. No. 3,512,930 discusses treatment of such particles with a reducing agent to convert at least some of the surface of the particles to a more stable phase; and U.S. Pat. Nos. 3,558,492, 3,585,141, and 3,634,252 are directed to treatment of the particles with a variety of organic compounds, such as with aromatic heterocyclic tertiary amines, with polymers containing tertiary amine groups in the polymer backbone, or with long-chain quaternary ammonium salts.

In addition, amines have long been used to treat metal surfaces to inhibit corrosion of those metal surfaces; see, for example, Mann et al, "Organic Inhibitors of Corrosion," *Industrial and Engineering Chemistry*, vol. 28, p. 159 (1936).

However, none of the above prior teachings has ever resulted in a commercially successful magnetic recording medium based on fine metal particles, and none of them has taught how to treat fine metal particles to obtain both good magnetic recording properties and environmental stability. Generally the prior suggestions directed to fine metal particles sacrifice either magnetic properties or they do not provide a desired degree of environmental stability. As to suggestions concerning chromium dioxide, the chemical nature of fine metal particles and chromium dioxide particles is so different that a treatment effective for chromium dioxide is generally not effective for fine metal particles. Thus, the reducing agents used with chromium dioxide particles are inappropriate for use with fine metal particles; the aromatic heterocyclic tertiary amines used with chromium dioxide particles produce a less-than-desired environmental stability with fine metal particles and are impractical for other reasons; and the tertiary-amine-containing polymers and long-chain ammonium salts ued with chromium dioxide particles have little if any effect in providing environmental stability when used with the fine metal particles.

SUMMARY OF THE INVENTION

By the present invention, the corrosion of fine metal particles in a magnetizable layer in a magnetic recording medium is greatly inhibited. Briefly, in a magnetic recording medium of the invention, the magnetizable layer of the recording medium comprises (a) a nonmagnetizable binder material; (b) fine magnetizable particles that comprise at least 75 weight-percent metal, at least a majority of which is iron, cobalt, or nickel, uniformly and thoroughly dispersed in the binder material; and (c) an organic compound that bears sterically unhindered aliphatic amine functionality.

Preferably, the fine metal particles also carry a chromium-based outer layer that is formed prior to dispersion of the particles in the binder material, and that layer provides a further increment of environmental stability; techniques for forming the chromium-based layer are described in a copending application of John S. Roden, Ser. No. 255,260, filed May 22, 1972. The binder material in the magnetizable layer preferably comprises a crosslinked polyurethane, and some preferred aliphatic-amine-bearing organic compounds may produce a faster rate of crosslinking of this binder material than would be produced in their absence. The binder material also preferably includes an acidic organic surfactant that improves dispersion of the particles in the binder material and, as a consequence of the improved dispersion, increases the magnetic performance of the recording media.

While the mechanism by which corrosion is inhibited according to the invention is not fully known, it is believed that the free electron pair on the nitrogen atom of the aliphatic amine group interacts with the particles, and that this interaction alters the capability or potential of the particles to corrode or oxidize. Whatever the reason, oxidation is greatly inhibited. For example, when a magnetic recording tape of the invention carrying 0.1-mil recorded signals was subjected to accelerated aging by storage in reel form at 150° F and 80% relative humidity for two weeks, the tape exhibited only a 0.6-decibel loss in output. By contrast, after the same storage, a control sample could not be tested because of a large amount of corrosion and degradation of the recording surface of the control sample.

This corrosion resistance is surprising in spite of the prior use of amines in corrosion inhibition of metal surfaces. It is surprising, first, because the treatment is effective even though the particles are so small in size that before the treatment they are typically pyrophoric. Second, the treatment is effective even if acidic organic surfactants, such as phosphate ester surfactants, are used to achieve preferred dispersions of the fine metal particles in the binder material. These acidic dispersing agents would be expected to react with any aliphatic-amine-bearing compound to form a quaternary salt; and quaternary salts do not provide useful corrosion inhibition with the fine metal particles that are the subject of this invention, presumably because there is no free electron pair on the nitrogen atom to interact with the particles.

Use of aliphatic-amine-bearing compound according to the invention provides an additional protection for fine metal particles that have already been coated with another protective layer that by itself improves environmental stability. For example, fine metal particles based on iron, cobalt, and/or nickel and having the previously mentioned chromium-based outer layer have a first increment of inhibition of corrosion because of that layer, and when such particles are treated with aliphatic-amine-bearing compounds according to the present invention, their corrosion resistance is further increased.

DETAILED DESCRIPTION OF THE INVENTION

Particles useful in the present invention generally comprise at least 75 weight-percent metal ingredients, since the more metal, the higher the magnetic moment of the particles and the more uniform their properties. Preferably the particles are at least 80 weight-percent metal and, when it can be practicably achieved, 85 or 90 weight-percent or more metal. Of the metal, at least a majority is preferably iron, whereby particles of high coercivity and high magnetic moment may be obtained; and more preferably, at least 75 weight-percent and even more preferably 85 weight-percent of the metal is iron. Also useful are particles wherein cobalt or nickel comprises at least a majority, or all, of the metal.

Particles presently preferred for the invention are acicular in order to improve their coercivity.[1] High coercivities make possible high outputs; but the particles may also be made with less than peak coercivity in order to tailor the magnetic recording medium in which they are incorporated to specific applications.

[1]. While the term "acicular particle" is used herein, as well as in the prior literature, such "particles" may in fact comprise a linear assemblage of smaller, generally equant particles held together by magnetic forces and acting as a single body for magnetic purposes. The term "acicular particle" is used herein to describe acicular structures that are mechanically a single particle as well as a magnetic assemblage of several particles, having a length-to-diameter ratio greater than about two, and exibiting uniaxial magnetic anisotropy; preferred particles have a length-to-diameter ratio greater than four or five.

The coercivity of the acicular particles becomes greater as the average diameter[2] of the particles becomes smaller, except that the particles may become superparamagnetic when of too small a size, which for iron-based particles is about 120 angstroms. As an indication of the change in coercivity with change in diameter, coercivities greater than about 500 oersteds are generally obtained with particles having an average diameter less than about 800 angstroms, while coercivities of greater than 1000 oersteds are generally obtained with particles having an average diameter less than about 400 angstroms. Larger-size particles, generally up to about 1500 angstroms in diameter, are also useful for certain magnetic recording applications.

[2]. By "average diameter" is meant the transverse dimension of the acicular particles, which provides a valid indication of the size of acicular particles, which provides a valid indication of the size of acicular particles for most purposes; where an acicular particle comprises an assemblage of generally equant particles, the "average diameter" of the acicular particles is the average diameter of the generally equant particles in the assemblage.

The particles may be made by a variety of methods. Solution-reduction methods using alkaline-metal borohydrides are presently preferred because average particle size and composition can be readily controlled by these methods. In such methods, solutions of metal salts such as salts of iron, cobalt, nickel, and chromium are mixed with solutions of alkaline-metal borohydrides such as sodium borohydride, preferably in a high-shear agitator located in a magnetic field of 500 or more oersteds, whereupon a rapid reaction occurs in which acicular metal particles precipitate from the solution. Other recognized procedures for forming metal particles include the decomposition of metal carbonyls in a thermal decomposition chamber with or without the influence of a magnetic field; the reduction of metal oxide particles as by heating in the presence of a reducing gas; and other solution-reduction techniques.

Although iron is the preferred metal ingredient in the particles, inclusion of some cobalt and/or nickel in iron-based particles, especially acicular iron-based particles prepared by the presently preferred solution-reduction processes using alkaline-metal-borohydride reducing agents, reduces the diameter of the particles, and thus increases coercivity. The diameter is reduced and the coercivity increased quite significantly by small additions of cobalt and/or nickel, such as additions amounting to about 0.1 weight-percent of the total metal ingredients in the particles. For the highest coercivities, making possible the highest outputs, at least one, and preferably at least two weight-percent of cobalt and/or nickel is included in iron-based particles. Very little further improvement in coercivity is obtained for amounts of cobalt and/or nickel in excess of about 10 weight-percent of the total metal. Amounts of cobalt or nickel in excess of about 20 or 25 weight-percent of the total metal in iron-based particles result in decreased coercivity and are less preferred. Further, the inclusion of cobalt or nickel in iron-based particles decreases magnetic moment; cobalt decreases magnetic moment less than nickel does and thus is preferred over nickel.

Chromium can also be included in particles of the invention, either in what may be called the core of the particle, or, preferably, in an outer layer around the particle. When chromium is included in the core particles (or, stated another way, as an alloy ingredient), generally in amounts less than about 20 weight-percent of the core particle, the magnetic moment of the particles is reduced; and accordingly, as to core or alloy ingredients, particles of the invention preferably include less than about 5 or 10 weight-percent chromium, and more preferably are substantially free of chromium. The preferred values for total chromium, cobalt, and nickel core ingredients in iron-based particles are no more than the preferred maximums for cobalt and/or nickel in iron-based particles given above. Certain other metals may be included as core ingredients in particles of the invention. For example, boron is inherently included in particles prepared by borohydride processes.

As previously noted, particles of the invention preferably have a chromium-based outer layer formed by exposing the particles under high-shear mixing conditions to a solution containing dichromate or chromate ions. The procedures and resulting particles are described more fully in the application of Roden mentioned earlier. As described there, a treatment giving the best results—providing recording media having good magnetic recording properties and improved environmental stability, and providing a high yield of treated particles—deposits about 3 to 5 weight-percent chromium on the particles. More or less chromium than 3 to 5 weight-percent can be applied while still achieving useful results, but if the particles comprise more than about 10 weight-percent chromium after the treatment, it tends to indicate that an uneconomically high proportion of the core particle has been dissolved; on the other hand, if particles having no chromium in the core comprise less than about 1 weight-percent chromium after treatment, the environmental stability of the particles and binder materials will be less than optimum. The chromium-based layer is believed to comprise metal chromite having the formula $Me_xCr_{3-x}O_4$, where Me is iron, cobalt, or nickel and $x$ is approximately 0.85.

Once the fine metal particles have been prepared, preferably with a chromium-based outer layer as described, the particles are mixed with an aliphatic-amine bearing organic compound. The mixing may be conveniently performed during the course of preparing a coating dispersion from which a magnetizable layer of a magnetic recording medium will be formed. For example, the aliphatic-amine-bearing organic compound may be added to a "grind paste," which typically comprises the fine metal particles, a dispersing agent, and solvent and which is formed, typically in a ball or sand mill, at an initial stage during preparation of the coating dispersion. The aliphatic-amine-bearing organic compound may be milled into the grind paste for a short time, after which binder material and any other additives are added to complete the coating dispersion. Mixing of the aliphatic-amine-bearing organic compound and particles may be done at other times than during preparation of a grind paste and in other mixing devices than a ball or sand mill. For example, an aliphatic-amine-bearing organic compound may be mixed with particles in a high-shear agitator prior to formation of a grind paste, or it may be mixed into binder material that is then mixed with particles to form a coating dispersion.

Generally, the aliphatic-amine-bearing compound is used in an amount providing more than about 0.0001 gram-equivalent of sterically unhindered aliphatic amine, and preferably more than about 0.0003 gram-equivalent of sterically unhindered aliphatic amine, per gram of fine metal particles. Since the aliphatic-amine-bearing compound will account for a part of the magnetizable layer in which the particles are dispersed, and, in fact, may be a polymer constituting at least a part of the binder material, care must be taken so that inclusion of the aliphatic-amine-bearing compound maintains desired mechanical and other properties of the magnetizable layer. For example, any low-molecular-weight (generally less than 500 molecular weight) aliphatic-amine-bearing organic compound is used in moderate amount, such as less than about 0.07 gram of such a low-molecular weight aliphatic-amine-bearing compound, and preferably less than about 0.05 grams of such an aliphatic-amine-bearing compound, per gram of particles. Whatever amount of aliphatic-amine-bearing organic compound, or other organic material is used, an attempt is made for most magnetic recording media of the invention to keep the weight-percent of particles high to obtain desired magnetic properties. Thus, for most magnetic recording media of the invention, the magnetizable particles constitues at least 70 weight-percent of all the non-volatile ingredients in the magnetizable layer. However, in other recording media, designed for special uses, the particles may be used in lower amounts, even as low as 10 weight-percent of the nonvolatile materials in the magnetizable layer.

By sterically unhindered aliphatic-amine-bearing organic compound it is meant that the amine groups are located either (a) at terminal positions (the preferred location), such as in a side group attached to a main nucleus, at the end of a polymeric chain, or at the end of a side group attached to a polymeric backbone, or (b) in a positon that is free of adjacent structure that would interfere with interaction between the free electron pair on the nitrogen atom and the particles. For example, tri-n-decyl amine is considered a sterically unhindered aliphatic-amine-bearing organic compound for purposes of this invention, since the free electron pair of the nitrogen atom is at the apex of a pyramid and the legs of the pyramid—that is, the decyl chains, which are of good flexibility—do not interfere with interacton between the free electron pair on the nitrogen atom and the particles. On the other hand, in a compound such as piperidine, which offers little if any improvement in environmental stability for fine metal particles, structure connected to the amine group interferes with interaction between the free electron pair on the nitrogen atom and the particles.

Preferred inhibition of corrosion has been obtained with tertiary amines, such as tris-2,4,6 (dimethylamino methyl) phenol, which is especially preferred, triallylamine, tributylamine, and tri-n-decylamine. But good corrosion inhibition is also obtained with primary and secondary amines, such as ethylene diamine, sec-butyl amine, t-butyl amine, n-decylamine, tetradecylamine, and stearyl amine. Also, good results have been obtained with amino silanes, such as N-beta-(aminoethyl)-gamma-animopropyltrimethoxy silane, which includes a combination of primary and secondary amines. It may be noted that aliphatic-amine-bearing compounds useful in the invention generally have a rather high basicity; for example, at least one of the amine groups on an aliphatic-amine-bearing compound useful in the invention generally has a $pK_a$ value (the log of the dissociation constant of a protonated version of the amine group) of 8 or more when measured in an aqueous solution at 25° C. The aliphatic-amine-bearing compound may bear other substituent groups so long as those groups do not sterically hinder the needed aliphatic-amine functionality or unduly reduce basicity.

A variety of binder materials may be used in practicing the invention. Polyurethane binder materials are preferred because of their superior mechanical properties, but useful binder materials may also comprise epoxy resins and vinyl chloride polymers and copolymers. The amine groups of an aliphatic-amine-bearing organic compound to be used in the invention should be not reactive with other components of the binder material. For example, primary or secondary amines should not be used with isocyanate-terminated binder materials, since a reaction between the amine group and isocyanate significantly reduces the activity of the electron pair on the nitrogen atom by which the aliphatic-amine-bearing compound presumably interacts with the fine metal particles.

As previously indicated, a dispersing agent is desirably used to assist in dispersing the particles in the binder material, and a preferred dispersing agent is an acidic organic surfactant such as a tridecyl polyethyleneoxide phosphate ester surfactant or a lecithin-type surfactant. Other useful dispersing agents include quaternary amine surfactants.

The invention is further illustrated by the following examples.

EXAMPLE 1

The following ingredients were charged to a small ball mill (a 5½ fluid-ounce "Quickie" mill supplied by Gardner Laboratories) having ⅛-inch-diameter grind media.

| | Parts by Weight |
|---|---|
| Acicular particles having an average diameter of 300 angstroms and comprising 75 weight-percent iron, 5-8 weight-percent cobalt, and 3-4 weight-percent chromium, the latter being present in an outer layer | 100 |
| A tridecyl polyethyleneoxide phosphate ester surfactant having a molecular weight of approximately 700 | 7 |
| Toluene | 87 |

These ingredients were mixed for 45 minutes in the mill, after which 4 parts of tris(dimethylamino methyl) phenol was added to the mill, and the contents milled for 3 minutes. Then 16.8 parts by weight of a 30-weight-percent-solids solution of a high-molecular-weight polyester polyurethane polymer synthesized from neopentyl glycol, poly-epsilon-caprolactone diol, and diphenyl methane diisocyanate dissolved in dimethyl formamide were added to the mill and the contents milled for an additional 10 minutes. The coating dispersion was completed by adding 4.2 parts of triisocyanate derivative of toluene diisocyanate and 1-di(hydroxymethyl) butanol to the mill, and milling the contents an additional 30 seconds.

Another coating dispersion was prepared to serve as a control by omitting the addition of tris(dimethylamino methyl) phenol.

Both dispersions were knife-coated onto 1-mil-thick polyethylene terephthalate films in a wet-thickness of 2 mils. The coatings were dried in air, then heated to 150° F for five minutes, and then allowed to cure at room temperature for one day. Both samples were then subjected to an environment of 150° and 80% relative humidity for 18 hours. The control sample had a large amount of visible corrosion over the entire recording surface after this exposure, whereas the sample of this invention did not show any visible sign of corrosion.

EXAMPLES 2–17

It has been found that corrosion in tape form can be indicated by coating a thin layer of grind paste (having a thickness of about 2 mils when dry) onto a glass plate and exposing the layer to an environment of 150° F and 80% relative humidity for 30 minutes. The layer is then observed for corrosion, and the amount of corrosion observed after 30 minutes is this test generally indicates the amount of corrosion that will appear after about 18 hours in a dry coating of the final dispersion with binder material on a tape backing.

In each of the following examples, the grind paste contained 100 parts of the fine metal particles described in Example 1, 7 parts of the surfactant described in Example 1, 87 parts toluene, and 3.5 to 4 parts (as indicated below) of the aliphatic-amine-bearing organic compound listed for each example. The ingredients were mixed for 45 minutes in a small ball mill having ⅛-inch-diameter grind media and then coated on the glass plate.

| Example No. | Aliphatic-Amine-Bearing Organic Compound | Concentration (Pts by Wt.) | Corrosion Observed After 30 Minutes |
|---|---|---|---|
| 2 | tris(dimethylamino methyl) phenol | 3.5 | None |
| 3 | dimethylamino methyl phenol | 4.0 | Very slight |
| 4 | triallylamine | 4.0 | Very slight |
| 5 | tributyl amine | 4.0 | Very slight |
| 6 | tri-n-decyl amine | 4.0 | Very slight |
| 7 | N-beta-(aminoethyl)-gamma-aminopropyltrimethoxy silane | 3.5 | None |
| 8 | ethylene diamine | 3.5 | None |
| 9 | n-butyl amine | 3.5 | Very slight |
| 10 | sec-butyl amine | 3.5 | Very slight |
| 11 | t-butyl amine | 3.5 | None |
| 12 | n-heptyl amine | 3.5 | Very slight |
| 13 | n-decyl amine | 3.5 | None |
| 14 | tetradecyl amine | 3.5 | None |
| 15 | stearyl amine | 3.5 | None |
| 16 | triethanol amine | 3.5 | Moderate |
| 17 | dibenzyl amine | 3.5 | Slight |
| Control (grind paste ingredients listed above without the amine-treated organic compound) | | None | Severe (the entire recording surface of the sample turned reddish-orange) |

EXAMPLES 18 and 19

The procedure of Examples 2–17 was repeated for two examples of the invention and for four comparative examples (Examples A-D). For some coatings in the comparative examples the fine metal particles did not carry a chromium-based outer layer; and for other coatings, the reaction product of tris-(dimethylamino methyl) phenol and 2-ethyl hexoic acid ("triquaternary salt" in the table below) was used as an additive instead of an aliphatic-amine-bearing compound. The additive was used in an amount of 4 weight-parts per 100 parts of pigment. The results are summarized below.

| Ex. No. | Chromium-based Protective layer | Additive | Corrosion Observed After 30 Minutes |
|---|---|---|---|
| 18 | No | tris(dimethylamino methyl) phenol | Slight |
| 19 | yes | tris(dimethylamino methyl) phenol | None |
| A | No | None | Severe |
| B | Yes | None | Moderate |
| C | No | triquaternary salt | Severe |
| D | Yes | triquaternary salt | Moderate |

COMPARATIVE EXAMPLE E

A magnetic recording tape like that of the control tape in Example 1 was prepared except that instead of the phosphate ester dispersing agent, a quaternary amine dispersing agent was used. When the resulting tape was subjected to an environment of 150° and 80% relative humidity for 18 hours, there was a large amount of visible corrosion on the recording surface.

EXAMPLE 20

A magnetic recording tape was prepared in the same manner described in Example 1 except that the tris(-dimethyl-amino methyl) phenol was added to the phosphate ester surfactant in an amount equal to 4 weight-parts per 100 parts of the fine metal particles before the surfactant was added to the ball mill. After exposure of the tape for 18 hours at 150° F and an 80% relative humidity, no corrosion of the tape was observed.

EXAMPLE 21

The procedure of Example 1 was repeated except that the amount of tris(dimethylamino methyl) phenol was varied from 1 to 7 weight-parts per 100 parts of the fine metal particles, and the samples were surface-treated in a conventional manner using a temperature of 185° F and a pressure of 70 pounds per square inch. After 18 hours of exposure at 150° F and 80% relative humidity, there was no corrosion for any of the samples.

EXAMPLES 22 and 23

The procedure of Example 1 was repeated except that different binder materials were added to the grind paste instead of the polyurethane-forming materials. In Example 22, 15.8 parts of a vinyl chloride-vinyl acetate copolymer (87 percent vinyl chloride and 13 percent vinyl acetate) and 5.2 parts of dioctylphthalate were used, and in Example 23, 13.6 parts of a diglycidyl ether of bisphenol A having an epoxide equivalent weight of about 190, 4.6 parts of an acrylonitrile-butadiene copolymer (15 weight-percent acrylonitrile), and 2.8 parts of methylene dianiline were used. In both examples no corrosion of the tape sample was observed after 18 hours of exposure at 150° F and 80% relative humidity.

What is claim is:

1. Magnetic recording medium comprising a magnetizable layer carried on a nonmagnetizable support, the magnetizable layer comprising (a) a nonmagnetizable organic polymeric binder material; (b) fine magnetizable particles that comprise at least 75 weight-percent metal, at least a majority of which is iron, cobalt, or nickel, uniformly and thoroughly dispersed in the binder material; and (c) an organic compound having a molecular weight of less than 500 and providing, per gram of particles, at least 0.0001 gram-equivalent of sterically unhinered aliphatic tertiay amine which is located in terminal groups on the organic compound, is not reacted with said binder material and has a $pK_a$ of at least 8 when measured in an aqueous solution at 25° C, whereby the recording medium exhibits improved resistance to corrosion of said magnetizable particles.

2. Magnetic recording medium of claim 1 in which the binder material comprises a polyurethane.

3. Magnetic recording medium of claim 1 in which the magnetizable layer further includes an acidic organic surfactant for assisting to disperse the particles.

4. Magnetic recording medium of claim 1 in which the particles carry a chromium-based outer layer formed prior to dispersion of the particles in the binder material.

5. Magnetic recording medium of claim 1 in which the aliphatic-amine-bearing oganic compound comprises tris-2,4,6-(dimethyl-amino methyl) phenol.

6. Magnetic recording medium of claim 1 which the particles constitute at least 70 weight-percent of the magnetizable layer.

7. Magnetic recording medium of claim 1 in which the aliphatic-amine-bearing organic compound is included in an amount providing, per gram of particles, at least 0.0003 gram-equivalent of sterically unhindered aliphatic amine having a $pK_a$ of at least 8 in an aqueous soluton at 25° C.

8. Magnetic recording medium of claim 1 in which said organic compound is included in an amount of less than 0.07 gram/gram of particles included in the medium.

9. Magnetic recording medium of claim 1 in which at least 75 weight-percent of the metal in said particles is iron.

10. Magnetic recording medium of claim 8 in which said particles carry a chromium-based outer layer.

* * * * *